United States Patent [19]

Kloenne et al.

[11] 4,038,877

[45] Aug. 2, 1977

[54] TIMING MECHANISM

[75] Inventors: Ernest F. Kloenne, Beech Grove; Richard C. Downing, Indianapolis, both of Ind.

[73] Assignee: P. R. Mallory & Co., Inc., Indianapolis, Ind.

[21] Appl. No.: 660,375

[22] Filed: Feb. 23, 1976

[51] Int. Cl.² .......................... F16H 29/00; H01H 7/08; H01H 43/10

[52] U.S. Cl. .......................................... 74/125; 200/38 F

[58] Field of Search .................. 74/125, 417; 200/38 F

[56] References Cited

U.S. PATENT DOCUMENTS

| | | | |
|---|---|---|---|
| 3,186,245 | 6/1965 | Bowman et al. | 200/38 F X |
| 3,417,631 | 12/1968 | Murray et al. | 74/125 |
| 3,626,117 | 12/1971 | Stafford | 200/38 F |
| 3,857,293 | 12/1974 | Godwin et al. | 74/125 X |

*Primary Examiner*—Leonard H. Gerin
*Attorney, Agent, or Firm*—Hoffmann, Meyer & Coles

[57] ABSTRACT

A pair of cooperating bevel gears cooperate to provide a coupling means between a constant speed drive means and a cam means.

A motor is carried by a U-shaped frame which can be inserted into a timer housing, the U-shaped frame having means to align coupling means to provide a second motor drive for the timer.

14 Claims, 3 Drawing Figures

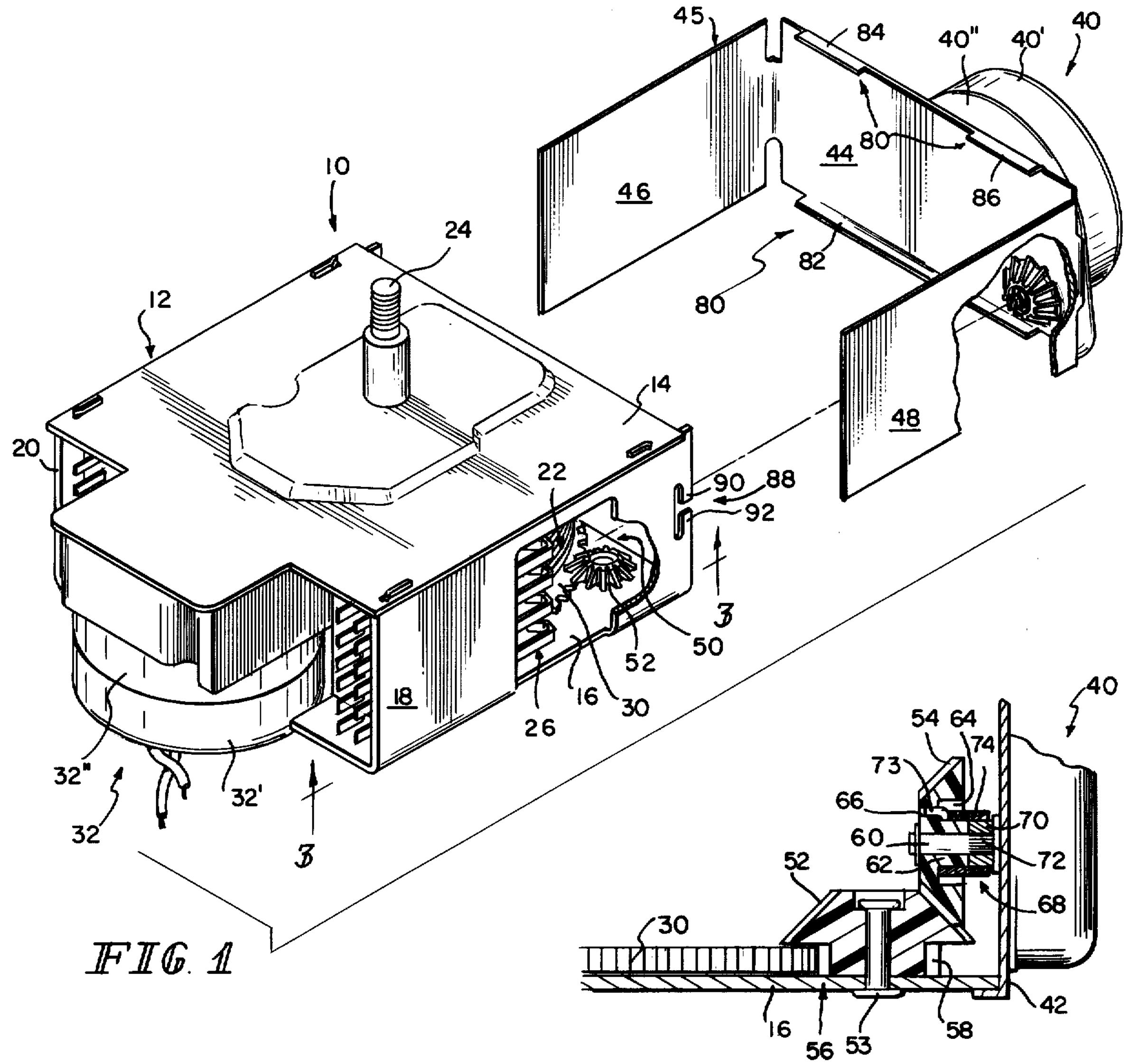
FIG. 1
FIG. 2
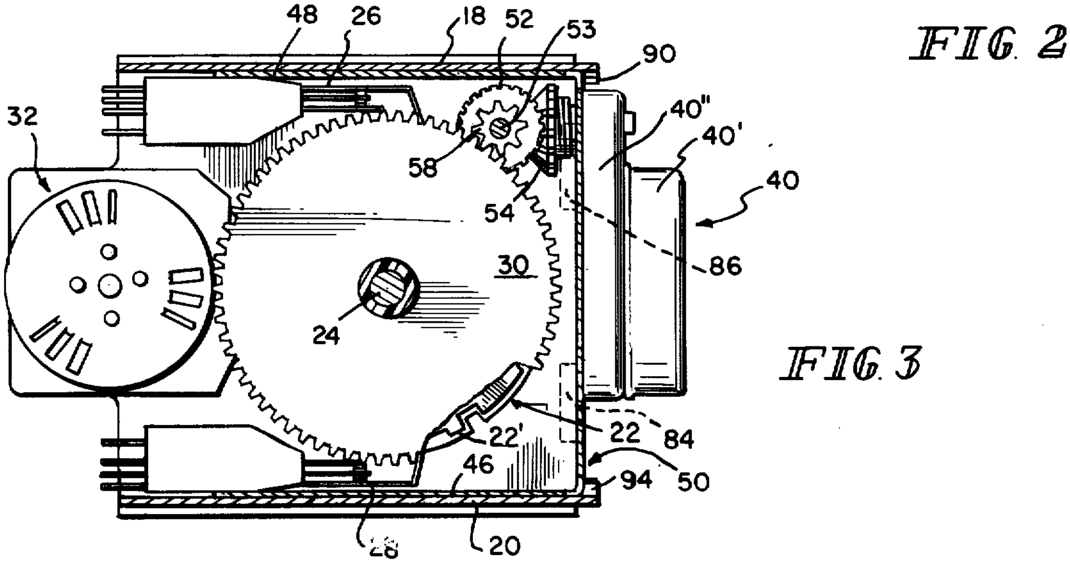
FIG. 3

TIMING MECHANISM

Generally speaking the present invention pertains to a timing mechanism which comprises a cam means and switch means responsive to a rotation of the cam means, a constant speed drive means, first and second cooperating bevel gears, first coupling means coupling the first bevel gear to the constant speed drive means, and a second coupling means coupling the second bevel gear to the cam means. In an embodiment of the invention, the bevel gears are used to couple a second constant speed drive means to the cam means so as to rotate same at another rate of speed.

There is also provided a U-shaped frame carrying the second speed drive means and being adapted to engage a timer housing, the U-shaped frame having means to align coupling means to provide a second constant speed drive means for the timer.

Timing mechanisms of the type having a plurality of control cams and a plurality of control switches responsive to movement of the cams are widely used in appliance control applications such as washers, dryers, dishwashers, etc. Generally, such timing mechanisms have an established program determined by a cam means which is driven in a step-by-step manner by an escapement. Such mechanisms can become very complicated and as a result become costly and occupy more and more space in the appliance. An example of such a mechanism is that described and claimed in U.S. Pat. No. 3,626,117 "Escapement and Timer Utilizing Same" issued Dec. 7, 1971 to Richard W. Stafford and which is incorporated herein by reference. Such a timing mechanism not only has a relatively large number of programs determined by a cam means, but is also has a sub-interval means which provides a means to control sequences of operation other than that provided by the cam means. Also, in some timing mechanisms such as this, it has been the practice, where occasion demands, to provide a means to "skip through or over" some of the cycles provided by the cam means. Such means usually includes a second constant speed drive means which selectively rotates or advances the cam means at a faster rate. All of these provisions make for a complicated mechanism with its attendant space utilization and cost saving problems.

The present invention represents an improvement to the above noted U.S. Pat. No. 3,626,117 in that a means is provided to couple the cam means to a second constant speed drive means, the whole arrangement of parts being simple and taking minimal additional space. Additionally, the second constant speed drive means is carried by a U-shaped frame which may be readily inserted into an existing timer housing.

It is therefore a feature of the invention to provide a timing mechanism having a coupling means to couple a constant speed drive means to a cam means. Another feature of the invention is to provide such a timing mechanism wherein the coupling means is simple, requiring a minimal amount of space. Another feature of the invention is to provide such a timing mechanism wherein the coupling means is used to couple a second constant speed drive means to a cam means. Another feature of the invention is to provide such a timing mechanism wherein a pair of cooperating bevel gears is used to couple a constant speed drive means to a cam means. Yet another feature of the invention is the provision of a U-shaped plate carrying a constant speed drive means adapted to engage a timer housing and having means to align coupling means to provide a second drive means for the timer.

These and other features of the invention will become apparent from the following description taken in conjunction with the following drawings wherein:

FIG. 1 is an isometric exploded view of a timing mechanism with portions thereof being removed for purposes of clarity;

FIG. 2 is a section showing cooperating bevel gears; and

FIG. 3 is a section taken along the line 3—3 of FIG. 1.

Referring now to the drawings, there is shown a timing mechanism 10 similar to that of the afore-mentioned U.S. 3,626,117 substantially enclosed in a housing 12, the housing including top and bottom plates 14 and 16 separated by side walls 18 and 20. Disposed within the housing is a cam means 22 comprising a plurality of cams 22' fixedly carried on shaft 24 which is rotatably journalled in the top and bottom plates. Rotation of the cams causes switches 26 and 28 to open and close in accordance with the intelligence of the cams. A gear 30 is also fixedly carried on shaft 24. As described in U.S. Pat. No. 3,626,117, such gear causes rotation of the shaft and therefore cams 22' through an escapement which is coupled to constant speed drive means 32 and the gear. As described in the afore-mentioned U.S. Pat. No. 3,626,117, the gear, and thus the cams, is rotated in a step-by-step manner through the escapement. Since the timing mechanism described thus far is substantially the same as that of U.S. Pat. No. 3,626,117, including the use of the escapement, the details of the escapement and its operation will not be described in detail. As shown, constant speed drive means 32 includes a synchronous motor 32' and a gear reduction means 32" enclosed in separate housings.

For those applications where it is desired to "skip cycles" a second constant speed drive is provided to advance the cam means 22 at a faster, constant speed rate. Second constant speed drive means 40 includes a synchronous motor 40' and a gear reduction means 40" enclosed in separate housings. The motor and the gear reduction means are carried on the outside surface 42 of the bottom portion 44 of U-shaped frame 45. As shown U-shaped frame 45 further includes a pair of upstanding legs 46 and 48 extending from the bottom portion. As shown with particular reference to FIG. 1 and 3, legs 46 and 48 slideably engage the inside of side walls 18 and 20 to be inserted into housing 12 and close the open end 50 of the housing.

When U-shaped frame 45 is in position to close the opening 50 of the housing 12, bevel gears 52 and 54 are engaged. Bevel gear 52 is rotatably mounted on bottom plate 16 through rivet 53 and includes a coupling means 56 coupling the gear to gear 30. Coupling means 56 includes spur gear 58 which is unitarily constructed with the bevel gear. Bevel gear 54 is carried on motor output shaft 60 through hub 62, the output shaft extending through an aperture (not shown) in the bottom portion 44 of U-shaped frame member 45 adjacent hub 62. There is a recess 64, including an aperture 66, in the bevel gear adjacent hub 62. Bevel gear 54 is coupled to shaft 62 through a one-way clutch 68. One-way clutch 68 includes a ring 70 fixedly carried on shaft 60 through knurl 72 and coil spring 74 carried on both the ring and hub 62 and having an end 73 extending into and carried by aperture 66.

In operation, when synchronous motor 32' is operating, bevel gear 52 is rotated by virtue of the rotation of gear and spring 74 will slip on hub 62 and ring 70. When motor 40' is operating, rotation of shaft 60 will cause rotation of ring 60 to cause spring 74 to tighten against the end 73 held in aperture 66. Such tightening of the spring causes rotation of bevel gear 54 to rotate bevel gear 52 to thus rotate gear 30 through spur gear 58. Rotation of gear 30, by either of the motors causes rotation of shaft 24 to rotate cam means 22, and, as previously described, when motor 32' is operating the rotation of cam means 22 will be in a step-by-step manner.

In order to assure operational alignment between the bevel gears 52 and 54 when U-shaped 45 is inserted in housing 12, there is provided an alignment means 80. Alignment means 80 includes a plurality of flanges 82, 84, and 86 extending from base portion 44 preventing the base plate from being inserted too far into the housing such that the bevel gears could become "jammed" or otherwise misaligned.

The U-shaped frame is fixedly held in place with the aid of fastening means 88. Fastening means 88 includes a plurality of tangs 90, 92 lanced from side wall 18 and a pair of similar tangs lanced from side wall 20. After the U-shaped frame has been properly inserted, one or both of the tangs of the pair of tangs is bent over to lock the bottom portion 44 in place. As viewed in FIG. 3, tang 90 and its counter-part, tang 94 have been bent over.

What is claimed is:

1. A timing mechanism comprising:
   a. cam means and switch means responsive to a rotation of said cam means,
   b. constant speed drive means,
   c. first and second cooperating bevel gears, and
   d. first coupling means coupling said first bevel gear to said constant speed drive means and a second coupling means coupling said second bevel gear to said cam means.

2. A timing mechanism according to claim 1 wherein said first coupling means includes a one-way clutch.

3. A timing mechanism according to claim 2 wherein said first bevel gear is carried on an output shaft of said constant speed drive means.

4. A timing mechanism according to claim 3 wherein said first bevel gear includes a hub portion and a recess adjacent thereto and said one way clutch comprises:
   a. a ring fixedly carried on an output shaft of said constant speed drive means, and
   b. a coil spring carried about said hub portion and said ring having an end extending into and carried by said recess.

5. A timing mechanism according to claim 1 wherein said second coupling means includes a gear carried by said cam means and a spur gear coupling said second bevel gear to said gear.

6. A timing mechanism according to claim 5 wherein said spur gear and said second bevel gear are unitarily constructed.

7. A timing mechanism comprising:
   a. a cam means and switch means responsive to a rotation of said cam means,
   b. an escapement means coupling a first constant speed drive means to said cam means so as to rotate said cam means in a step by step manner when energy is applied to said first constant speed drive means,
   c. a second constant speed drive means,
   d. first and second cooperating bevel gears, and
   e. first constant coupling means including a one-way clutch means coupling said first bevel gear to said second constant speed drive means, and a second constant speed coupling means coupling said second bevel gear to said cam means.

8. A timing mechanism according to claim 7 wherein said first bevel gear includes a hub portion carried by an output shaft of said second constant speed drive means, and a recess adjacent said hub portion said one-way clutch comprising:
   a. a ring fixedly carried by said output shaft, and
   b. a coil spring carried about said hub portion and said ring and having an end extending into and carried by said recess.

9. A timing mechanism according to claim 7 wherein said second coupling means includes a gear carried by said cam means and a spur gear unitarily constructed with said second bevel gear.

10. In a timing mechanism wherein a cam means is rotated in response to a first motor to selectively open and close switches,
   a. a housing enclosing at least a portion of said timing mechanism, said housing including at least two opposed walls separating top and bottom plates and at least one open end,
   b. a U-shaped plate having a base portion and upstanding legs,
   c. a second motor carried by an outer surface of said base portion and having an output means extending through an aperture in said base portion,
   d. said upstanding legs slideably engaging said walls to insert said plate into said open end to substantially close same,
   e. coupling means carried by said housing engaging said output means and coupled to said cam means,
   f. alignment means maintaining said coupling means in operating engagement with said output means, and
   g. fastening means fastening said U-shaped plate to said housing.

11. In a timing mechanism according to claim 10 wherein said output means is a first bevel gear and said coupling means includes a second bevel gear engaging said first bevel gear.

12. In a timing mechanism according to claim 11 wherein said output means further includes a one-way clutch.

13. In a timing mechanism according to claim 10 wherein said alignment means includes at least one flange extending from opposed sides of said bottom portion of said plate, one each engaging said top and bottom plates of said housing.

14. In a timing mechanism according to claim 10 wherein said fastening means includes at least one tang extending from said opposed side walls and engaging said bottom portion of said U-shaped plate.

* * * * *